(12) United States Patent
Katogi et al.

(10) Patent No.: US 7,080,507 B2
(45) Date of Patent: Jul. 25, 2006

(54) EXHAUST GAS PURIFIER

(75) Inventors: Kozo Katogi, Hitachi (JP); Masami Nagano, Hitachinaka (JP); Hiroshi Sekine, Hitachinaka (JP); Hiroyuki Takamura, Hitachinaka (JP); Shinji Nakagawa, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 115 days.

(21) Appl. No.: 10/758,268

(22) Filed: Jan. 16, 2004

(65) Prior Publication Data

US 2004/0200212 A1    Oct. 14, 2004

(30) Foreign Application Priority Data

Jan. 20, 2003    (JP)    ............................. 2003-010502

(51) Int. Cl.
*F01N 3/00*    (2006.01)
(52) U.S. Cl. .................... 60/289; 60/285; 60/299
(58) Field of Classification Search .................. 60/285, 60/289, 299, 290
See application file for complete search history.

(56) References Cited

U.S. PATENT DOCUMENTS

| | | | |
|---|---|---|---|
| 3,391,710 A | | 7/1968 | Härtel |
| 3,771,921 A | * | 11/1973 | Rohde et al. ............... 417/12 |
| 5,088,463 A | * | 2/1992 | Affeldt et al. ............... 123/459 |
| 5,233,830 A | * | 8/1993 | Takeshima et al. ........... 60/278 |
| 5,331,809 A | * | 7/1994 | Takeshima et al. ........... 60/289 |
| 5,675,968 A | | 10/1997 | Katashiba et al. |
| 5,785,025 A | * | 7/1998 | Yoshiume et al. .......... 123/497 |
| 5,979,157 A | * | 11/1999 | Kinugasa et al. ............. 60/289 |
| 6,192,678 B1 | * | 2/2001 | Tachibana .................... 60/289 |

FOREIGN PATENT DOCUMENTS

| | | |
|---|---|---|
| DE | 196 08 060 | 7/1997 |
| JP | 05-079319 | 3/1993 |
| JP | 2000-352338 | 12/2000 |
| JP | 2001-241319 | 9/2001 |
| JP | 2003-027987 | 1/2003 |

OTHER PUBLICATIONS

Shinji Nakagawa, et al., "A New Air-Fuel Ratio Feed Back Control for ULEV/SULEV Standard," SAE Technical Paper Series, 2002-01-0194.

* cited by examiner

*Primary Examiner*—Thomas Denion
*Assistant Examiner*—Diem Tran
(74) *Attorney, Agent, or Firm*—Crowell & Moring LLP

(57) ABSTRACT

In order to improve the decrease of the catalytic action and the deterioration of the exhaust purification performance, a catalyst installed in the exhaust pipe of an engine and a secondary air pump for supplying secondary air into the exhaust pipe are provided, and the secondary air pump is operated even after the engine has stopped.

16 Claims, 11 Drawing Sheets

CASE 1

"1"=ENGINE IS IN OPERATION
"0"=ENGINE IS AT A STOP

"1"=SECONDARY AIR PUMP IS ON
"0"=SECONDARY AIR PUMP IS OFF

CASE 2

100% ENGINE IS IN OPERATION
DUTY ENGINE IS AT A STOP

CASE 3

"1"=ENGINE IS IN OPERATION
"0"=ENGINE IS AT A STOP

"1"=SECONDARY AIR PUMP IS ON
"0"=SECONDARY AIR PUMP IS OFF

EXHAUST GAS PURIFIER

BACKGROUND OF THE INVENTION

The present invention relates to an exhaust gas purifier of an engine and a controller thereof.

According to a prior art, in order to remove toxic contents in the exhaust gas of an engine, for example, unburnt hydro carbon compound (HC), carbon monoxide (CO) and nitrogen oxides (NOx), there has been disclosed an exhaust gas purifier that is equipped with a catalytic converter rhodium installed in an exhaust pipe and converts them to non-toxic components by catalytic action.

With this purifier, however, since the catalytic action depends upon the catalyst temperature, the catalytic action cannot be performed until the catalyst temperature increases after the engine has started. Thus, there has been disclosed another exhaust gas purifier that have the toxic contents in the exhaust gas absorbed into the catalyst up to a certain volume temporarily and then purifies them under a temperature higher than the specified (Japanese Patent Application Laid-open No. Hei 05-79319 (1993)).

With the prior art as above, however, exhaust gas remains in the exhaust pipe and exhaust gas purifier after the engine has stopped. Because of this, there has been a problem that water content in the residual exhaust gas liquefies and adheres onto the surface of the catalyst, causing another problem that the catalyst temperature increase is delayed due to the decrease of the contact area between the catalyst and exhaust gas and vaporization of the adhered water content at the next engine start and so the purification performance lowers. Besides, if a sudden change in the catalyst temperature is caused, temperature difference is generated between the portions with and without adhered water and the catalyst may possibly break due to thermal stress.

SUMMARY OF THE INVENTION

The present invention is made in view of the above problems and its object is to improve the purification performance and reliability of the exhaust gas purifier.

In order to solve the problems, the present invention is equipped with a catalyst installed in the exhaust pipe of an engine and a secondary air pump for supplying secondary air into the exhaust pipe, and operates the secondary air pump in accordance with the operating condition of the engine.

Besides, the present invention is equipped with a catalyst installed in the exhaust pipe of an engine and a secondary air pump for supplying secondary air into the exhaust pipe, and operates the secondary air pump after the engine has stopped.

BRIEF DESCRIPTION OF DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DETAILED DESCRIPTION OF THE PREFERRED EMBODIMENTS

The present invention will be discussed hereinafter in detail in terms of the preferred embodiment of an exhaust gas purifier according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Preferred embodiments of the exhaust gas purifier according to the present invention are described hereunder, using figures.

Figure 1:
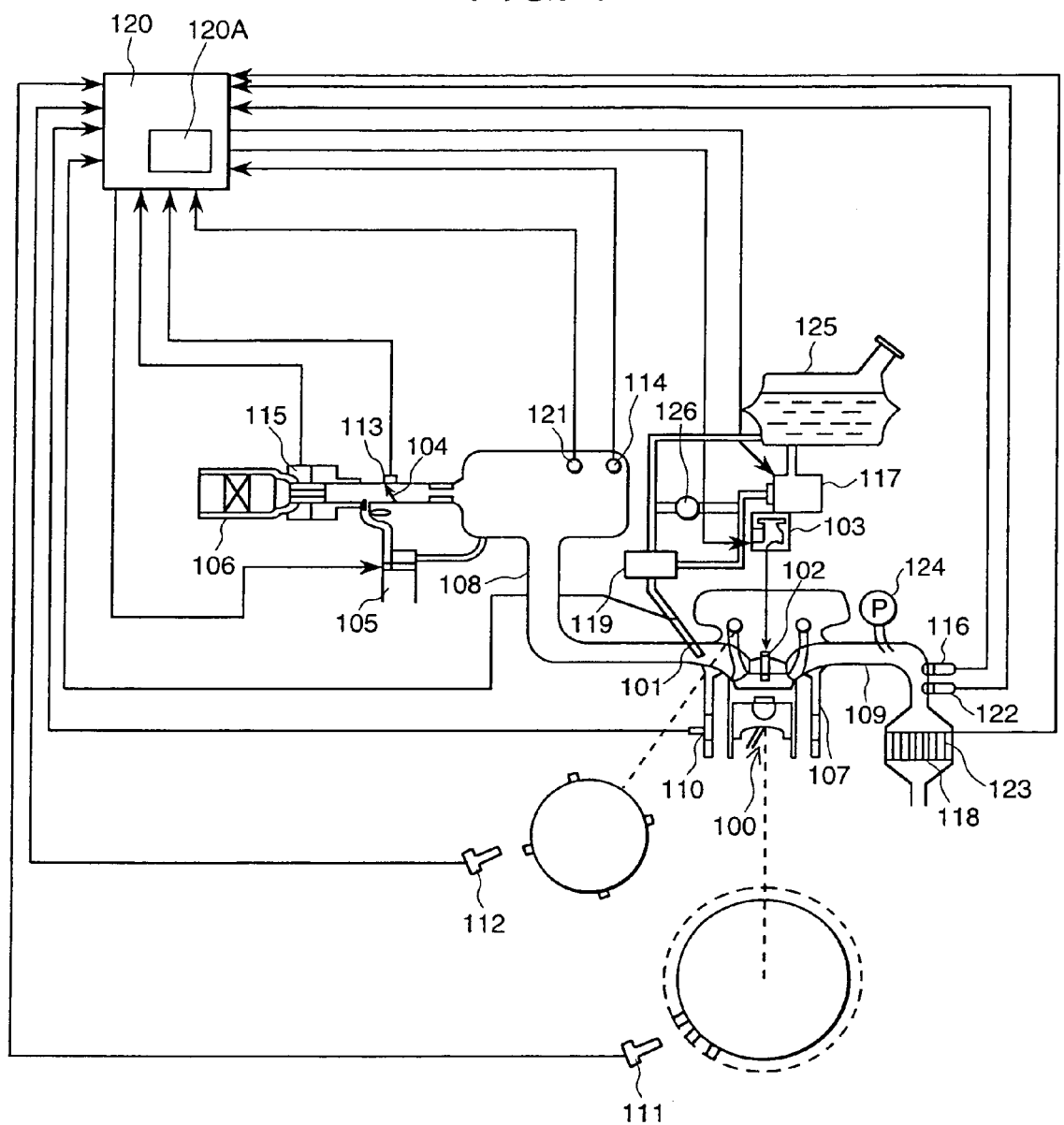
FIG. 1 is a diagram showing the engine construction of an embodiment of the present invention.

FIG. 1 shows the construction of the engine relating to the present invention. An engine 100 comprises an injector 101, ignition plug 102, ignition coil 103, throttle 104, water temperature sensor 110, crank angle sensor 111, cam angle sensor 112, throttle position sensor 113, suction pipe pressure sensor 114 or suction air flowmeter 115, secondary air pump 124, and catalyst 118 equipped with a catalyst temperature sensor 123, which all are connected to an engine controller 120.

Fuel is supplied from a fuel tank 125 by a fuel pump 117, and the fuel pressure is kept constant by a fuel pressure regulating valve 119. Besides, there is provided a fuel bypass valve 126 for bypassing the fuel pressure regulating valve to fail-safe the fuel pressure.

To measure the suction air temperature and exhaust temperature to be used as control parameter of the engine, there are installed a suction air temperature sensor 121 and exhaust temperature sensor 122.

Besides, there is provided a bridge circuit capable of reversing the voltage to be applied to the fuel pump or a gear device capable of switching the rotational direction (normal and reverse) of the fuel pump. With this, the fuel pressure can be decreased, as required, by rotating the fuel pump in reverse.

Figure 2:
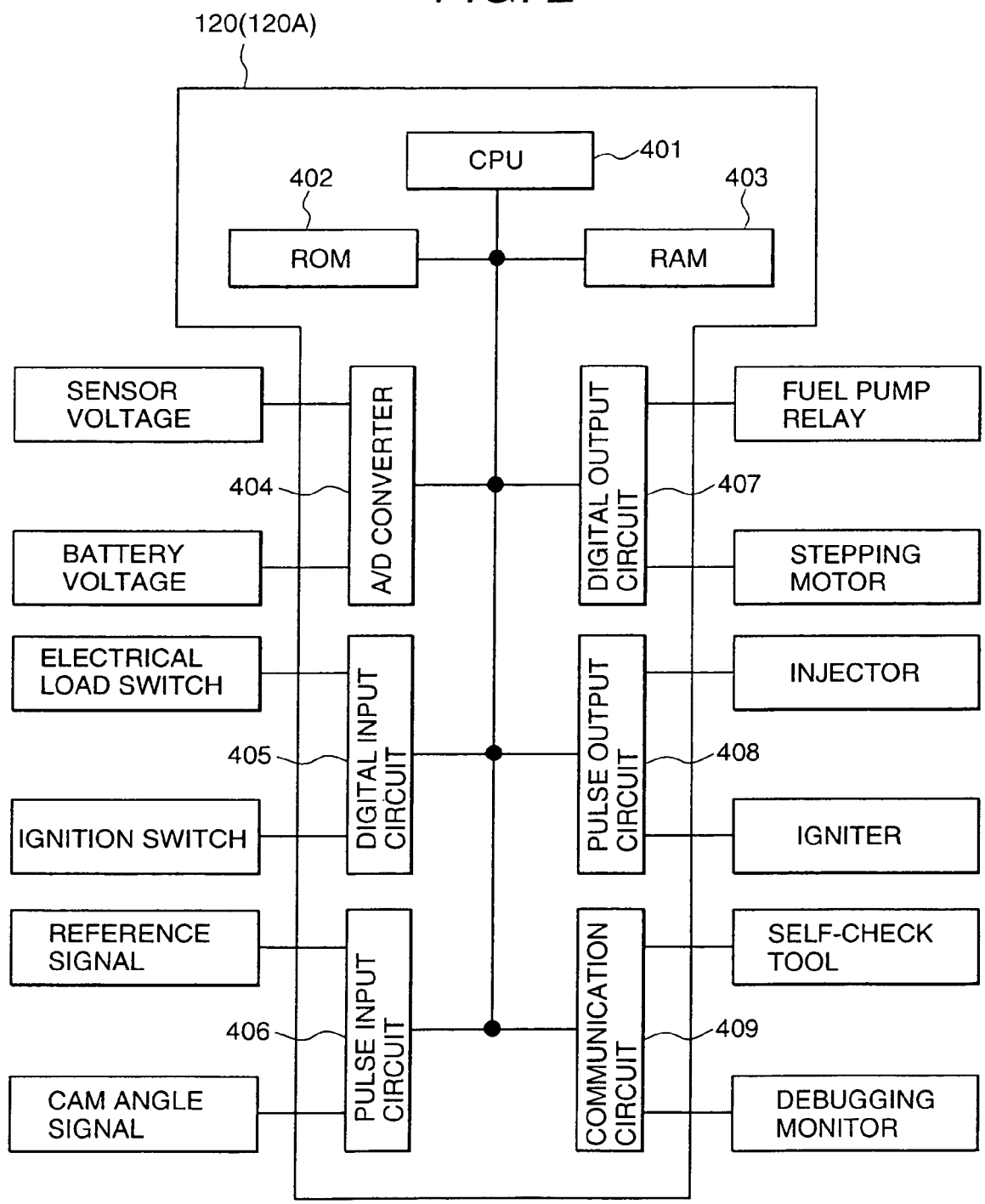
FIG. 2 is an explanatory drawing of the engine controller.

FIG. 2 shows a brief composition of the engine controller. The engine controller comprises a CPU 401 that runs numeric and logical operation, ROM 402 that at least stores the programs executed by the CPU 401 and data thereof, RAM 403 that stores data temporarily, A/D converter 404 that receives analog voltage signals from the sensors, digital input circuit 405 that receives switch signals showing the operating conditions, pulse input circuit 406 that counts the time interval of pulse signals or number of pulses in a specified length of time, and also a digital output circuit 407 that switches on and off an actuator (not shown) based on the computation result of the CPU, pulse output circuit 408 that outputs a timer count, and communication circuit 409. With the communication circuit 409, data in the engine controller can be sent to the outside and the internal condition of the engine controller can be changed from the outside using communication commands.

The engine controller that receives an output from the suction pipe pressure sensor or suction air flowmeter, converts the sensor voltage, using a table, and calculates the actual suction air volume Qa per unit time.

The engine controller also measures the pulse signal of the crank angle sensor and calculates the engine rotational speed NDATA based on the number of pulses in a specified length of time or time interval of the pulses.

Dividing the suction air volume Qa per unit time by NDATA and then by the number of cylinders, the suction air volume Qacyl per cycle of each cylinder is calculated.

Multiplying Qacyl by the specific coefficient KTI and then by a correction coefficient including an air-fuel ratio control correction variable, to be explained later, the fuel volume TI that can be burnt with Qacyl is obtained and, by opening the injector for a specified length of time, necessary volume of fuel is injected to generate air-fuel mixture in every combustion.

The correction coefficient $COEF_n$ as follows is multiplied in computing TI.

$$TI = COEF_n \times KTI \times Qacyl$$

$COEF_n$ includes an air-fuel ratio correction coefficient $ALPHA_n$.

$$COEF_n = 1 + ALPHA_n + \text{increase correction factor}$$

If the control is made on each cylinder, individual parameter is specified, varying the subscript n from 1 to each cylinder number.

The exhaust gas from the combustion in the combustion chamber contains toxic substances such as NOx and unburnt HC. Since these substances result in air pollution if discharged into the air as they are, NOx and HC are decomposed and purified into $N_2$, $H_2O$ and $CO_2$ inside the catalyst before discharge. In order to decompose and purify the toxic substances efficiently inside the catalyst, it is essential to operate the engine at an air-fuel ratio that realizes high purification efficiency of the catalyst.

Generally speaking, if an engine is operated under a stoichiometric condition (theoretical air-fuel ratio), toxic substances in the exhaust gas is decom posed and purified inside the catalyst.

For example, a chemical reaction mentioned below is caused under a stoichiometric condition.

$$C_mH_n + (m+n/2)O_2 \rightarrow mCO_2 + n/2 H_2O$$

Since hydro carbon contained in gasoline has higher carbon content m, an approximation of n=2×m is applied and the following approximation expression can be obtained.

$$C_mH_{2m} + (2m)O_2 \rightarrow mCO_2 + mH_2O$$

Each is converted to "mole" unit as follows.

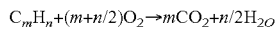

$$C_mH_{2m} = m \times 14 \text{ g}$$

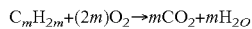

$$2mO_2 = m \times 64 \text{ g}$$

Although hydro carbon is not defined in the above approximation, the calculation means that 64 g of hydrogen is generally needed for 14 g of gasoline and 18 g of water is generated if specific gasoline composition is defined. It is generally said that the air in the volume of about 14.7 times the weight of gasoline is needed in ideal combustion and water of about 1.4 times the weight of gasoline is generated.

The water resulting from the combustion of the fuel is in vapor phase if the exhaust gas temperature is above the due-point temperature (100° C. under normal condition) but adheres onto the exhaust pipe inside if the exhaust pipe temperature is below the due-point temperature. For the same reason, the water adheres on or is absorbed by the catalyst if the catalyst temperature is cooled below the due-point temperature.

Catalyst has a characteristic that higher exhaust gas purification action is performed if the contact area between the exhaust gas and catalyst metal is wider, and therefore, if the catalyst temperature is low, there arises a problem that the contact area between the exhaust gas and catalyst metal is decreased due to the water content adhered on or absorbed by the catalyst and that the purification performance of the catalyst lowers. Besides, if a sudden change in the catalyst temperature is caused, temperature difference is generated between the portions with and without adhered water and the catalyst may possibly break due to thermal stress.

To prevent the above, the present invention realizes the combustion control in accordance with the exhaust gas temperature.

Figure 3:
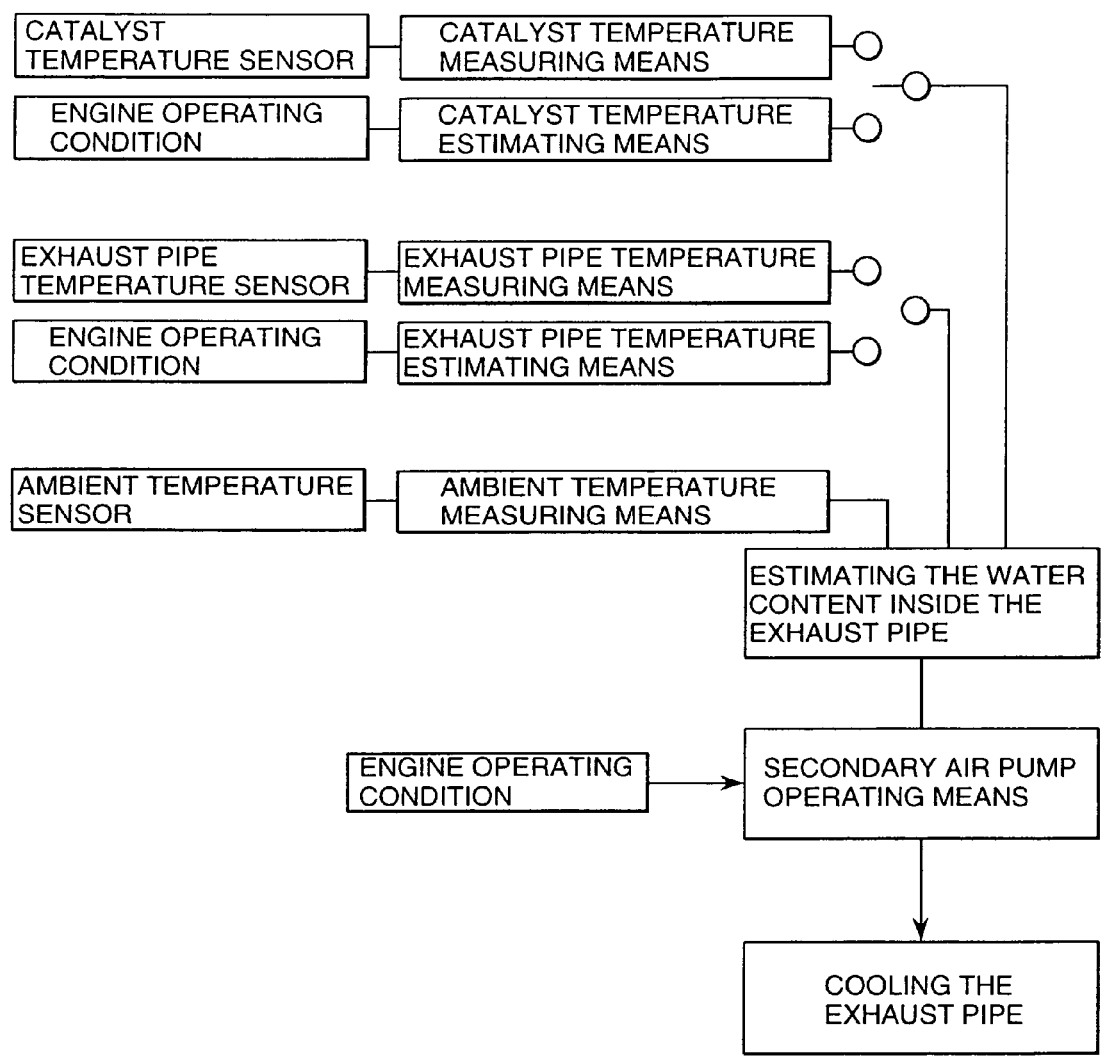
FIG. 3 is a control block diagram of the present invention.

For example, as shown in FIG. 3, using a means for measuring or estimating the catalyst temperature and a means for measuring or estimating the exhaust pipe temperature, there is provided a water content estimating means that estimates the water content remaining in the exhaust pipe based on the temperature information.

Thereby, the secondary air pump is operated in accordance with the engine operating condition.

In other words, during the engine operation, if the catalyst temperature is above a specified temperature, the secondary air pump is operated so that the exhaust gas is purified in the catalyst.

In the case after the engine has stopped, the secondary air pump is operated to cool down the exhaust pipe until the catalyst temperature becomes below the specified, that is, below the due-point temperature.

In addition, by providing an HC emission preventing means inside the exhaust pipe and controlling the fuel pipe pressure as well as suction valve, exhaust valve, throttle valve, ISC valve, etc. accordingly, emission of unburnt HC can be prevented.

If the exhaust temperature can be measured, the combustion control is performed directly in accordance with the exhaust temperature. That is, voltage of the exhaust temperature sensor 122 is inputted and converted to the exhaust pipe temperature.

Figure 4:
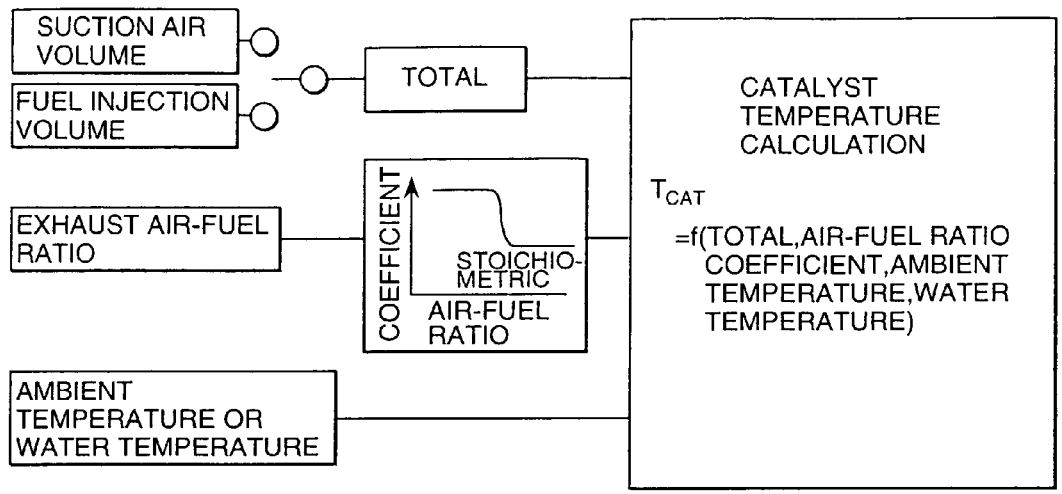
FIG. 4 is an explanatory drawing on the temperature estimation.

In the case of estimating the exhaust temperature, to begin with, voltage of the suction air temperature sensor or water temperature sensor is inputted and converted to suction temperature or water temperature, which in turn is set as the initial value of the exhaust pipe temperature of catalyst temperature. Then, using the total SGMTI of the fuel volume TI that can be burnt with Qacyl, the suction air volume per cycle of each cylinder, or the total SGMQA of the suction air volume QA, and the suction air temperature, the exhaust pipe temperature is estimated as shown in FIG. 4. Instead, the catalyst temperature can be estimated in a similar manner. However, because the catalyst temperature further increases when it reaches a certain temperature, approximately 300° C., as HC reacts due to the catalytic action, air-fuel ratio is also used as one of the variables for estimating the catalyst temperature.

Until the exhaust pipe temperature reaches a specified temperature after the engine has started, the air-fuel ratio correction variable of each cylinder is set to a value other than zero so as to supply unburnt HC and oxygen into the exhaust pipe at the same time to let them react inside the exhaust pipe. The exhaust pipe temperature can be increased quickly by reaction heat.

Figure 5:
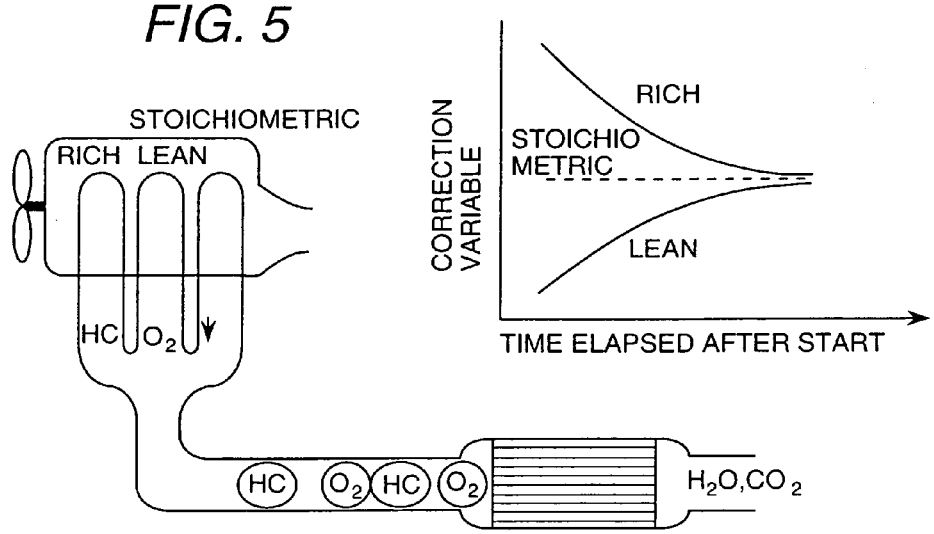
FIG. 5 is an explanatory drawing on the catalyst temperature control.
Figure 5:
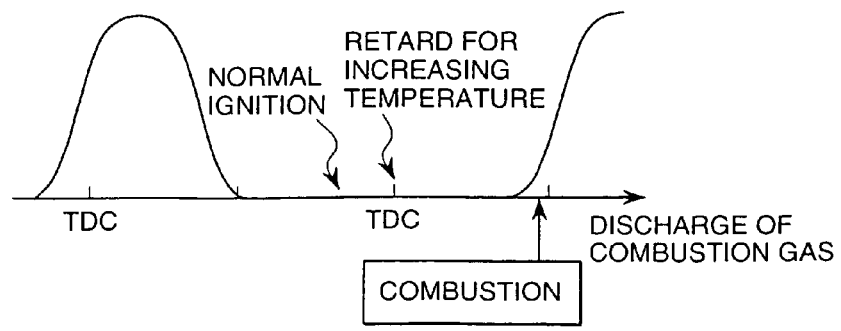

After the exhaust pipe temperature has reached the specified temperature, the air-fuel correction efficient is set to zero so as to stop the temperature increase control. As shown in FIG. 5, when the exhaust pipe temperature or catalyst temperature is above the temperature increase control start temperature, the air-fuel ratio correction efficiency is varied for each cylinder. Then, when the exhaust pipe temperature or catalyst temperature has reached a specified temperature, the correction variable is set to zero.

The temperature increase control of the exhaust pipe does not necessarily employ the temperature as a threshold but any of the time elapsed after engine stop, water temperature, total suction air volume, total fuel injection volume can be used as the threshold.

Another means for increasing the exhaust pipe temperature is to so adjust the ignition timing that the combustion gas at relatively high temperature is discharged into the exhaust pipe. Besides, in setting the above-mentioned air-fuel ratio correction coefficient for each cylinder, correction range is limited because, if the volume of unburnt HC increases more than what can be processed in the catalyst, the exhaust gas level lowers. In order to increase the exhaust pipe temperature without increasing the correction range, it is also possible to let the ambient air into the exhaust pipe and accelerate the reaction inside the exhaust pip.

As a means for letting the air into the exhaust pipe, a secondary air inlet means for the exhaust pipe is used and the ambient air is supplied by an air pump. It is also permissible that a check valve is employed so that the ambient air is sucked when the exhaust pipe pressure becomes lower than that of the ambient air.

With a turbo type engine system, it is permissible that the air compressed by the turbo is supplied into the exhaust pipe through a regulating valve.

If the water content remaining in the exhaust gas after the engine has stopped adheres or condenses on the catalyst, the catalytic performance lowers at the next engine start as explained previously. To remove the water content in the exhaust gas remaining in the exhaust pipe after the engine has stopped, the secondary air pump is operated to replace the gas in the exhaust pipe with the ambient air.

In this replacement, a length of time of operating the air pump after the engine stop shall be equal to or longer than the time to fill the exhaust pipe volume corresponding to the pump discharge. Otherwise, the pump shall be operated until the exhaust pipe temperature becomes lower than a specified time.

Figure 6:
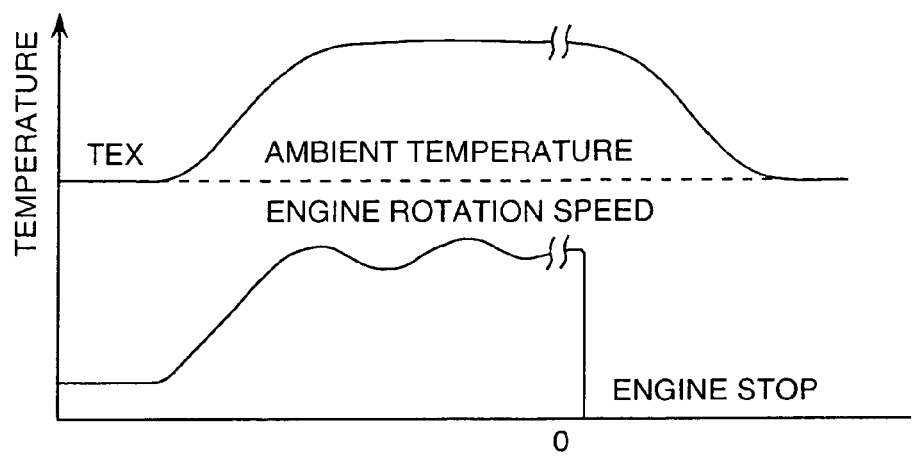
FIG. 6 is an explanatory timing chart of the control.
Figure 6:
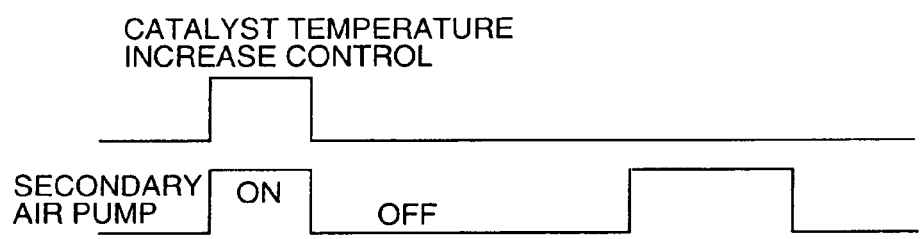

FIG. 6 is a timing chart.

Catalyst temperature increase control is performed after a specified operating condition is met after the engine start and until a specified time has elapses and, at the same time, the exhaust pipe temperature TEX is lower than the specified.

A specified operating condition can be a condition where, for example, the water temperature is higher than 20° C. and, at the same time, the rotational speed of the engine is lower than the idling speed by several thousands r/min.

As a means of the catalyst temperature increase control, an air-fuel ratio correction efficiency is specified for each cylinder in the case of individual air-fuel ratio control of cylinders. Using the time elapsed as an argument, a correction coefficient for each cylinder is searched from a data table and necessary interpolation is given. Otherwise, using data tables provided for each rich side and lean side, three different levels of coefficient, rich-side, lean-side, and no-correction (stoichiometric), are selected one by one for every injection timing and the fuel is injected accordingly so that no cylinder is set under a fixed rich, lean or stoichiometric condition.

If exhaust pipe temperature sensor is not available, it is possible to estimate the exhaust temperature according to the total suction air volume or total fuel injection volume, using the suction air temperature as an initial value, and a value filtered at every unit time is regarded as the exhaust pipe temperature.

During the individual air-fuel ratio control of cylinders, the air pump is operated to let the secondary air into the suction pipe. When a turbo charger is available, the compressed output of the turbo is sent into the exhaust pipe.

Exhaust gas in the exhaust pipe is purged out according to the exhaust pipe temperature TEX and ambient air temperature TAMB after the engine stop. A length of time of this purging, however, is limited up to the maximum duration time of purifier operation in consideration of discharge from the battery.

The air pump is operated until the difference between the exhaust pipe temperature TEX and ambient air temperature TAMB reaches a specified value. If estimated exhaust pipe temperature and/or estimated ambient air temperature is used, an appropriate length of time of operation according to the exhaust pipe temperature after the engine stop is specified and the pump is operated for the specified length of time.

Figure 7:
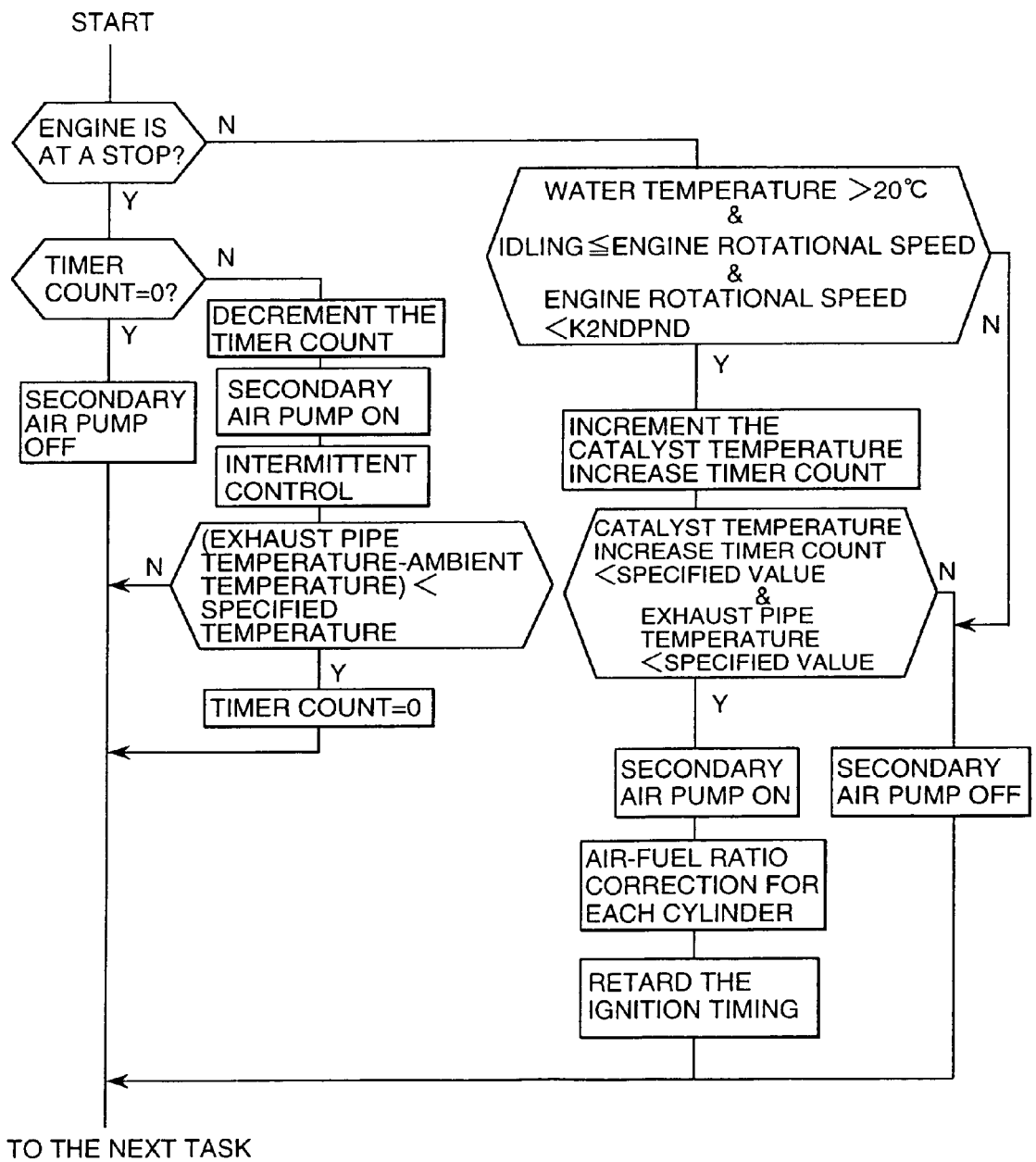
FIG. 7 is an explanatory flow chart of the control.

FIG. 7 is a flowchart of the control.

To begin with, whether the engine is at a stop is judged.

If the engine is at a stop, whether the secondary air pump operation timer count is zero is judged. If the timer count is zero, the secondary air pump is stopped.

If the timer count is other than zero, the timer count is decremented by every specified length of time. At the same time, the exhaust pipe temperature and ambient air temperature are monitored and the temperature difference is calculated.

If the temperature difference is lower than a specified value, the timer count of the secondary air pump is cleared.

If the engine is in operation after the engine has started, whether the engine operating condition is under a specified condition is judged. If the water temperature is higher than the specified and, at the same time, the rotational speed of the engine is lower than the idling speed by K2NDPND (several thousands r/min), the timer for the catalyst temperature increase control is actuated and the timer count is incremented by every specified length of time.

If the timer count for the catalyst temperature increase control is less than the specified and, at the same time, the exhaust pipe temperature is lower than the specified, the secondary air pump is operated.

At the same time, the suction air volume and rotational speed of the engine are obtained to calculate a basic fuel injection volume.

If no exhaust pipe temperature sensor is available, the suction air volume in every specified length of time is totalized and an estimated exhaust gas temperature is calculated from the total. The estimated exhaust gas temperature is filtered at every specified unit time to obtain the exhaust pipe temperature. Instead of the total suction air volume, total fuel injection volume can be used for the above.

While the secondary air pump is in operation, a correction coefficient for the individual air-fuel ratio control of cylinders is calculated. For example, three different correction coefficients, rich-side correction coefficient, stoichiometric correction coefficient and lean-side correction efficient, are obtained according to the timer of the timer for the catalyst temperature increase control.

Three different values are selected one by one for every fuel injection timing and corrected into the basic fuel injection volume. It is also permissible to select the three values at every specified unit time and corrected into a basic fuel volume.

Besides the individual air-fuel ratio control of cylinders, if a means for increasing the catalyst temperature, by which the ignition timing is retarded so as to combust the exhaust gas inside the exhaust pipe, is employed additionally, the temperature increases more quickly.

After the specified exhaust pipe temperature has been reached or the timer setting of the catalyst temperature increase control has elapsed, the secondary air pump is stopped.

Figure 8:
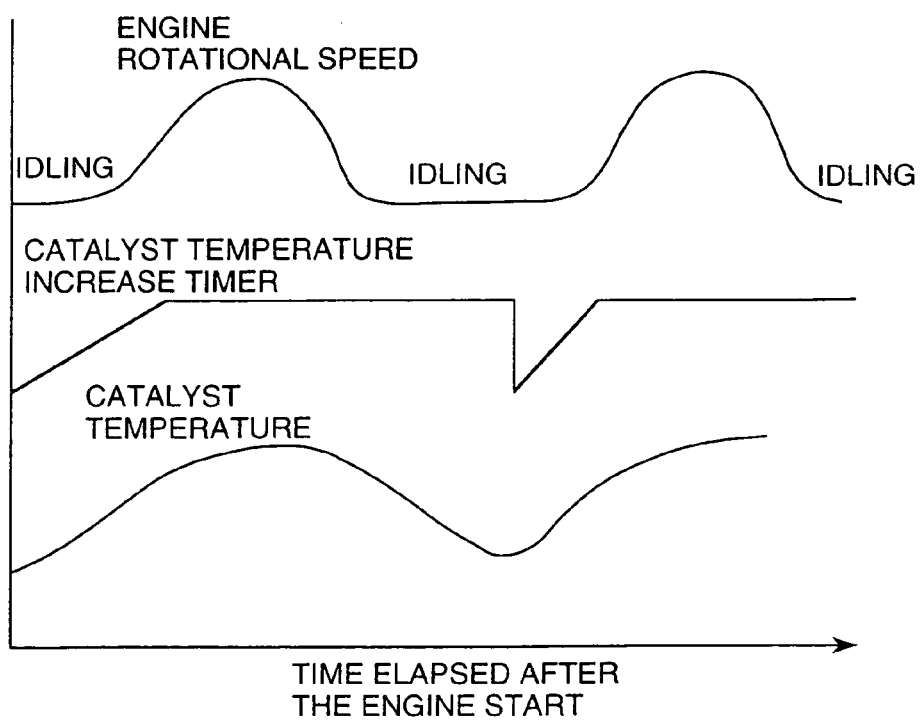
FIG. 8 is an explanatory drawing on the timer control during idling.

If the catalyst temperature drops even in an idling state under normal ope ration condition, as shown in FIG. 8, it is permissible to clear or decrement the timer count of the catalyst temperature increase control and restart the catalyst temperature increase control.

Figure 9:
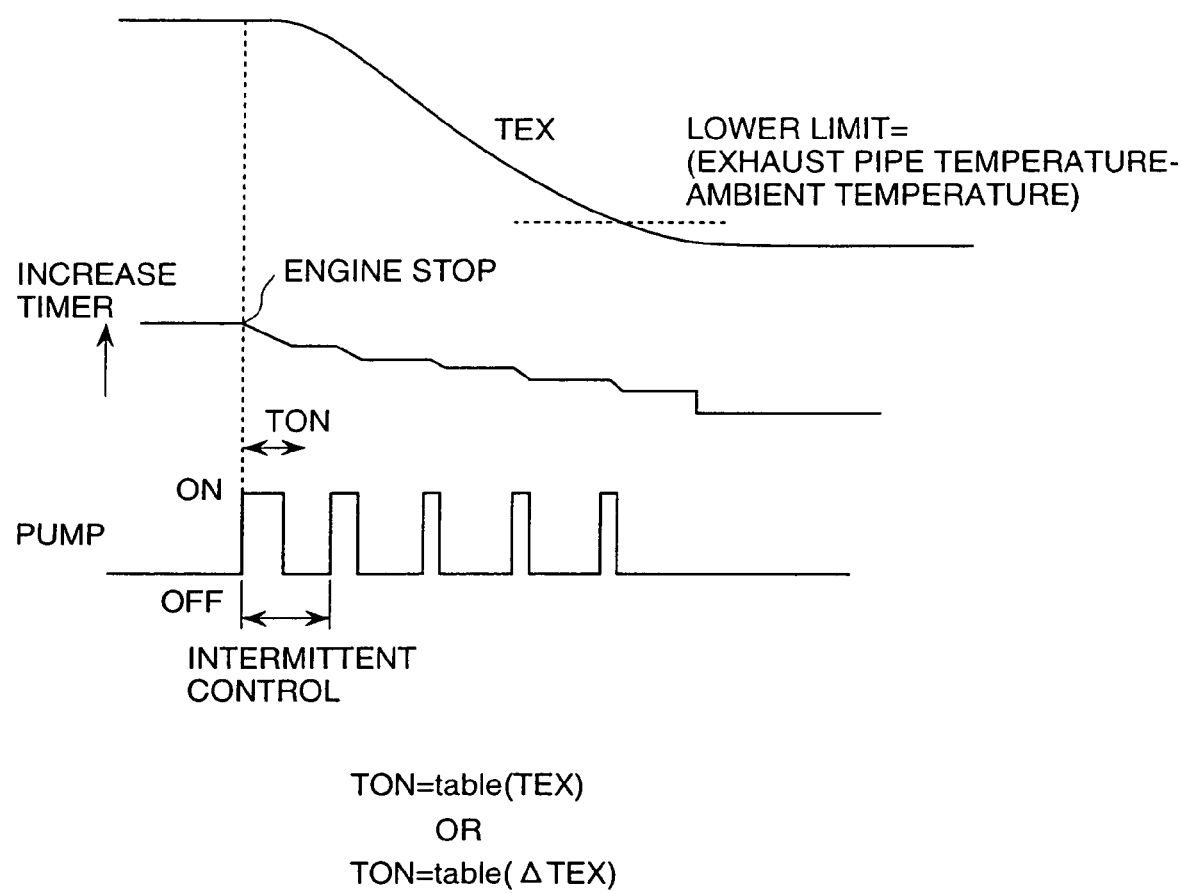
FIG. 9 is an explanatory drawing on the operating time setting for the secondary air pump.

The secondary air pump operation after the engine has stopped can be continuous but, in consideration of the battery discharge after the engine stop, it may be intermittent operation. Intermittent operation can be, for example, such that a length of the operating time is set per cycle of operation in accordance with the catalyst temperature or that the operating time is set in accordance with the decrease ratio at which the catalyst temperature decreases in every specified length of time after the engine has stopped. Brief description of the operation is show n in FIG. 9.

Although the air volume of the secondary air pump needed for processing the exhaust gas during the engine operation is relatively big, the air volume for cooling the exhaust pipe after the engine stop can be minimal because air for proc essing the exhaust gas is not needed. Because of the above, the size of the secondary air pump necessary for the present invention can be smaller than that of the secondary air pump used for processing the exhaust gas during the engine operation.

For the same reason, it is permissible to install the secondary air pump to be used during the engine operation separately from the secondary air pump to be used after the engine stop and the one to be used after the engine stop is made smaller in size or that the rotational speed of the secondary air pump to be used after the engine stop is set lower than that of the one to be used during the engine operation.

A control method available for switching the rotational speed can be such that the voltage applied to the secondary air pump is switched or that the battery voltage is controlled by duty so as to control the mean voltage.

Figure 10:
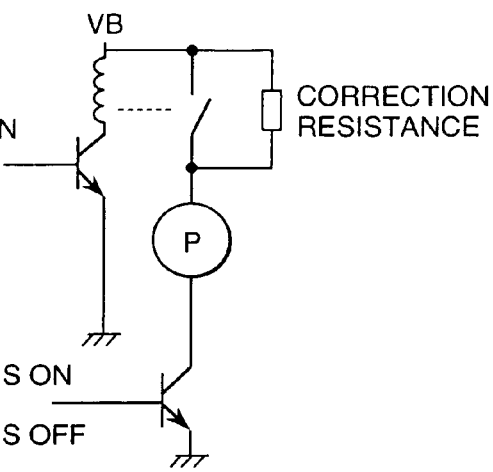
FIG. 10 is an explanatory drawing on the connection switching circuit for the secondary air pump.
Figure 10:
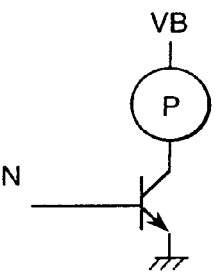
Figure 10:
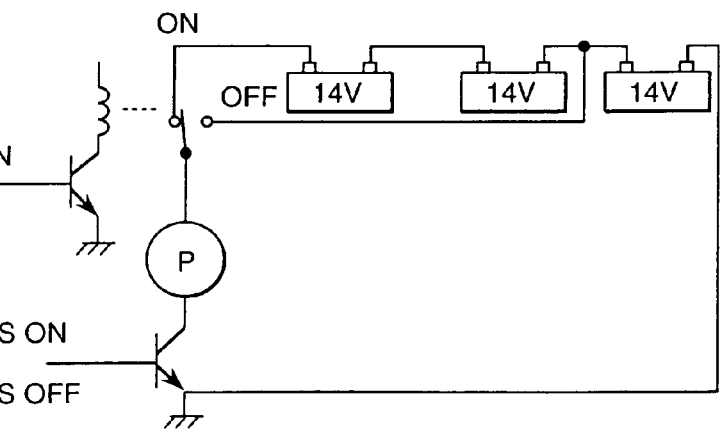

If the basic battery voltage is 42 V, which means three 14-V batteries are connected in series, it is also permissible to install a connection switching circuit that applies the voltage of one battery out of the three to the secondary air pump while the engine is at a stop. An embodiment using this circuit is shown in FIG. 10.

Figure 11:
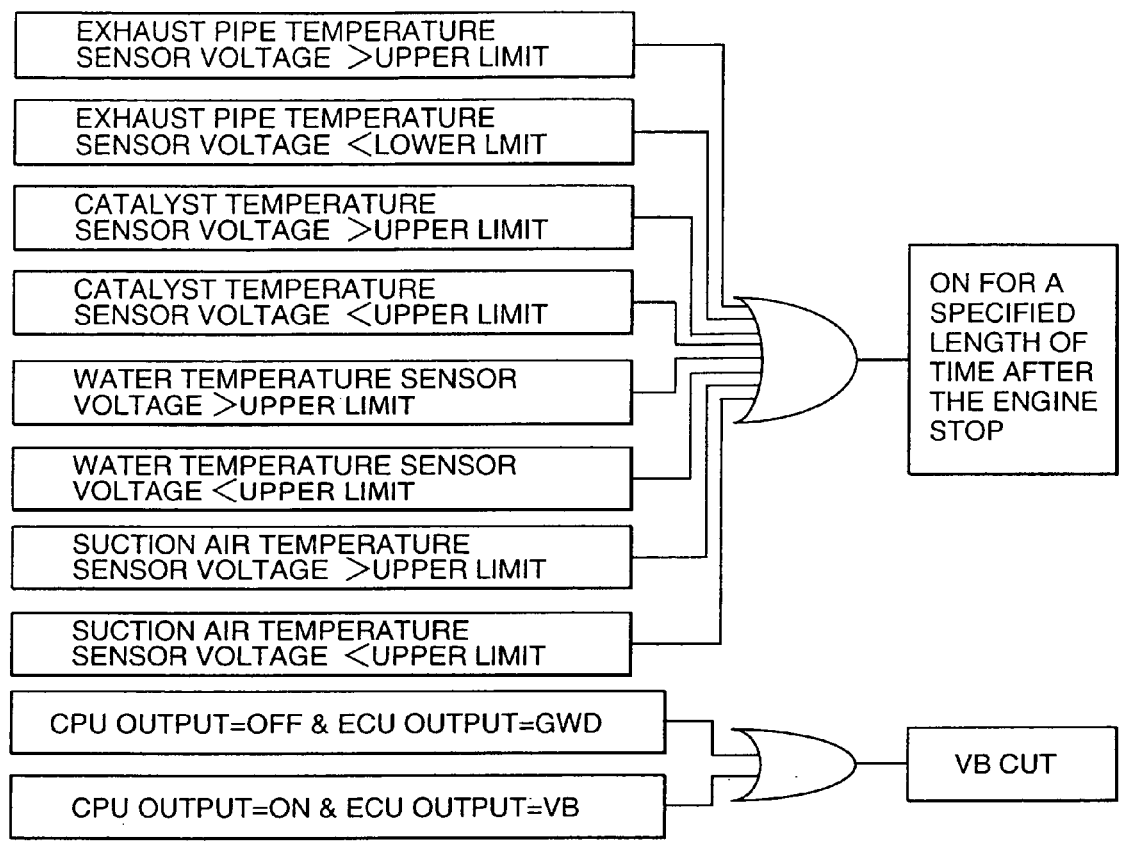
FIG. 11 is an explanatory drawing on the diagnosis and fail-safe function.

FIG. 11 shows the disconnection and short-circuit diagnosis of the exhaust pipe temperature sensor, catalyst temperature sensor and secondary air pump.

If the exhaust pipe temperature sensor voltage or catalyst temperature sensor voltage is outside a specified range, the sensor is judged to have failed and the fail-safe function, to be described later, is actuated. When the exhaust pipe temperature or catalyst temperature is to be estimated, the cooling eater temperature or suction air temperature is used as a parameter. For this reason, if the water temperature sensor or suction air temperature sensor has failed, the fail-safe function is also actuated.

An applicable concrete fail-safe function may be such that the secondary air pump is operated according to a specified length of time after the engine stop irrespective of the exhaust pipe temperature of catalyst temperature.

If the CPU output for operating the secondary air pump does not agree with the mode of the output terminal of a control unit, for example, the CPU output is ON while the control unit is OFF or the CPU output is OFF while the control unit is ON, the output of the secondary air pump is judged to be faulty. If this happens, the VB connected to the secondary air pump is cut open.

Besides, if the increase speed of the exhaust pipe temperature is too quick or too slow, something abnormal has possibly been caused in the exhaust pipe or secondary air system. If this happens, the control system is judged to have failed.

If a failure is detected, failure information is stored in the self-diagnosis storage area in the control unit and a failure indication lamp MIL is lit to inform the operator of the failure of the engine control system and also to ask for necessary repair of the system.

In order to reduce the exhaust gas level, not only high catalytic performance is needed but also discharge of the exhaust gas needs to be controlled while the engine is at a stop. In a certain case, for example, unburnt HC component of the exhaust gas remains in the combustion chamber after the engine has stopped. Besides, if fuel leaks out of the injector, it directly becomes unburnt HC even though the volume is very small.

Figure 12:
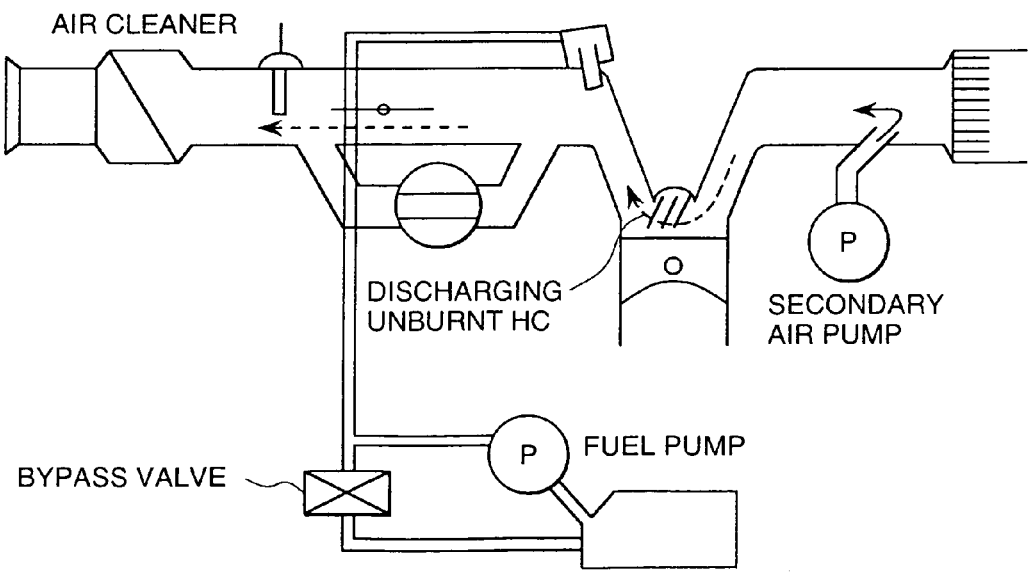
FIG. 12 is an explanatory drawing on a countermeasure against unburnt HC in the combustion chamber.

In order to discharge the unburnt HC component from the combustion chamber, both exhaust valve and suction valve of the combustion chamber are fully opened and also the throttle valve or ISC valve is opened to let the gas out from the intake manifold side. FIG. 12 shows a timing chart.

If the exhaust valve and suction valve cannot be opened independently, the crankshaft is rotated, using a device such as starter, for a specified number of times or up to a specified crank angle. And then, the rotation is stopped at a crank angle where the suction valve and exhaust valve are set open.

If there exists no overlapped angle where the suction valve and exhaust valve are set open at the same time, the rotation is stopped at a crank angle where at least the suction valve side is set open.

While the crankshaft is rotated for a specified number of times or up to a specified crank angle, it is also possible to supply the secondary air into the exhaust pipe so as to discharge the exhaust gas from the exhaust pipe side to the intake manifold side.

In order to prevent fuel leakage from the injector, the fuel pressure in the fuel pipe is reduced immediately after the engine has stopped. Residual fuel in the fuel pipe is immediately returned back to the fuel tank by means of, for example, installing a bypass valve for bypassing a pressure regulator, bypassing the fuel pump, or reversing the fuel pump operation.

Although the inlet of the secondary air is made on the upstream side of the catalyst in the above embodiment, it is also possible to install it near the exhaust valve of the engine so as to better mix the exhaust gas and secondary air.

Figure 13:
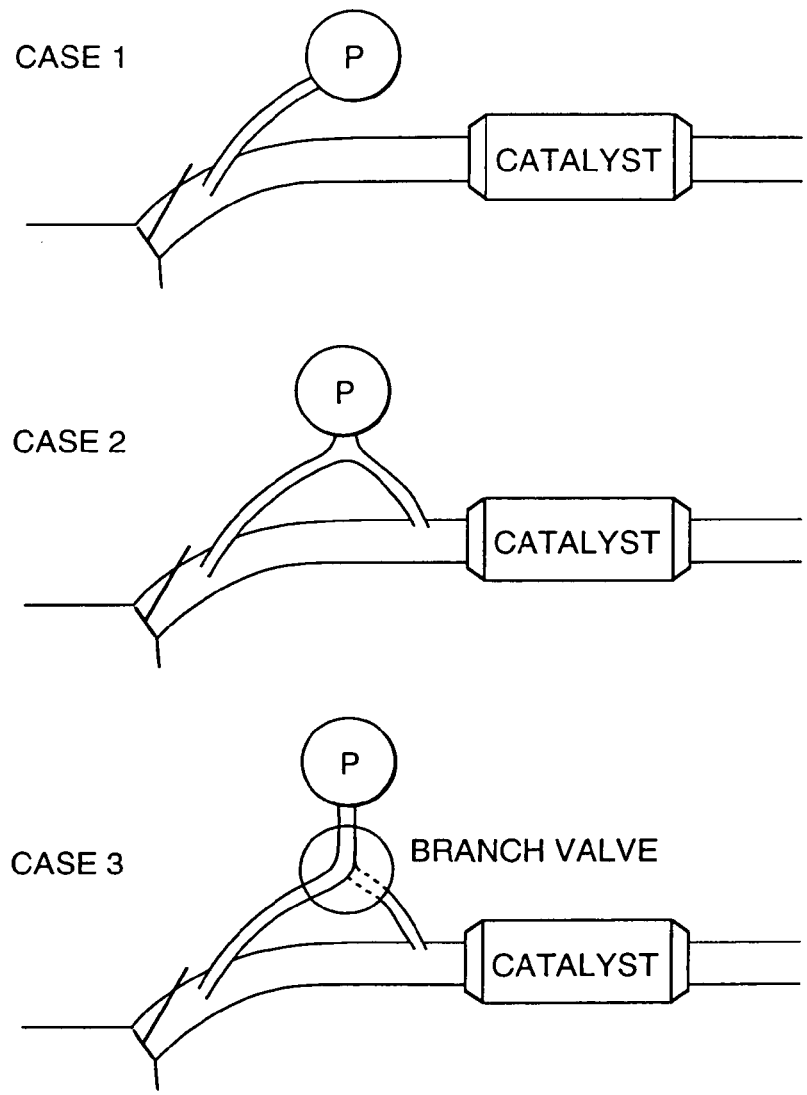
FIG. 13 is an explanatory drawing on letting the secondary air near the exhaust valve.

For example, the exhaust gas and secondary air are better mixed by supplying the secondary air towards and over the exhaust valve as shown in FIG. 13.

It is also permissible to install the secondary air inlet on both the upstream side of the catalyst and the exhaust valve side.

It is also possible to construct a system where a branch valve is installed in the secondary air piping so that the secondary air is let only into the exhaust valve side during the engine operation and into the upstream side of the catalyst after the engine has stopped.

Figure 14:
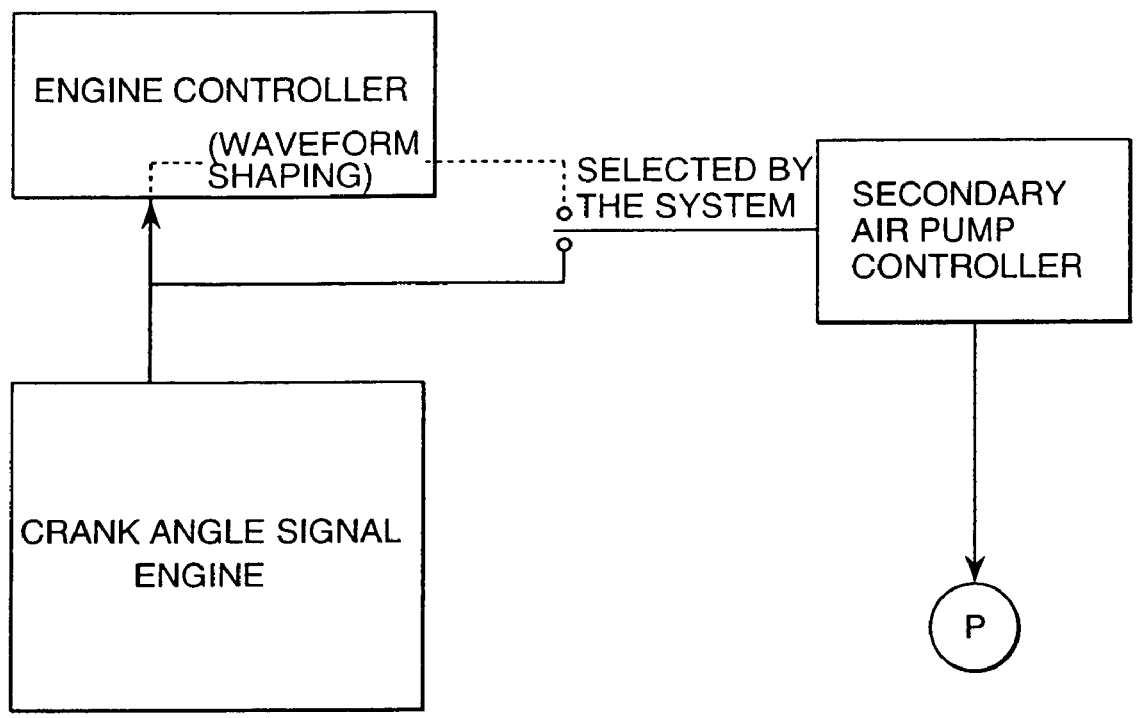
FIG. 14 is a view showing a separate secondary air pump controller.
Figure 14:
Figure 14:
Figure 14:

The above-mentioned embodiments are so constructed that the secondary air control is performed only in the engine control unit. However, if whether the engine is in operation or at a stop can be judged, the secondary air pump can be controlled accordingly, and therefore, the secondary air pump control as shown in FIG. 14 becomes available. That is, whether the engine is in operation is judged based on an input signal relating to the engine rotation, such as a crank angle signal; the engine is judged to be at a stop if no crank angle signal is inputted for a specified length of time, and the secondary air pump is controlled accordingly.

Beside, it is likely to happen that water enters from the muffler side of a car in the outside if it rains or snows. If a car parked in a garage for a long time is moved to the outside under intense sunlight and the exhaust pipe temperature or catalyst temperature is still low immediately after the movement, the exhaust pipe temperature or catalyst temperature may become lower than the due-point temperature and so it is also possible that water vapor is sucked into the catalyst from the muffler side.

Figure 15:
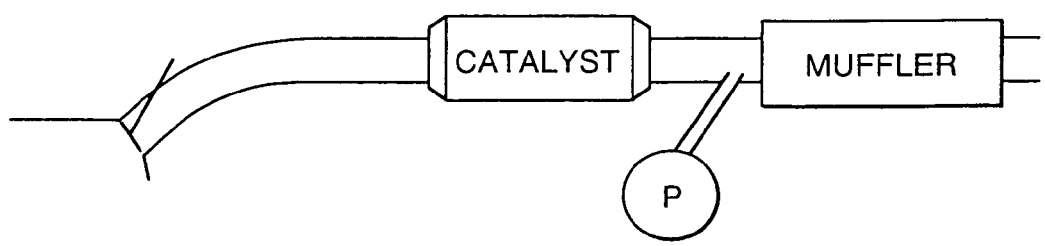
FIG. 15 is an explanatory drawing on letting the secondary air into the downstream side of the catalyst.

In consideration of the cases where water vapor adheres onto the downstream side of the catalyst as explained above, it is also possible to install the secondary air inlet on the downstream side of the catalyst as shown in FIG. 15.

The above can prevent adhesion onto the catalyst of the water vapor sucked from the muffler side.

Because the water content in the residual exhaust gas can be prevented from liquefaction and adhesion onto the surface of the catalyst, the catalytic performance of the exhaust gas purifier can be maintained and, because no thermal stress is generated in the catalyst support, reliability of the catalyst can be improved. Besides, it becomes possible to use the catalyst for a longer period o f time than in a prior art.

Although the present invention has been illustrated and described with respect to exemplary embodiment thereof it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. An exhaust gas purifier comprising a catalyst installed in the exhaust pipe of an engine and a secondary air pump for supplying secondary air into the exhaust pipe, wherein said secondary air pump is operated for a specific length of time after the engine has stopped when any of the water temperature sensor, suction air temperature sensor, catalyst temperature sensor and exhaust pipe temperature sensor of the engine is judged to have failed.

2. An exhaust gas purifier according to claim 1, further comprising at least one of a means for measuring and a means for estimating the exhaust pipe temperature of the engine, wherein said secondary air pump is operated for a specified length of time after the engine has stopped when the measured or estimated exhaust pipe temperature is outside a specified range.

3. An exhaust gas purifier according to claim 1, wherein a secondary air inlet is provided near the exhaust valve of the engine.

4. An exhaust gas purifier according to claim 1, wherein a secondary air inlet is provide in the upstream side of the catalyst.

5. An exhaust gas purifier according to claim 1, wherein a secondary air inlet is provide in the downstream side of the catalyst.

6. An exhaust gas purifier according to claim 1, wherein said secondary air pump operates intermittently.

7. An exhaust gas purifier according to claim 1, wherein the number of revolutions of said secondary air pump after the engine has stopped is less than that while the engine is in operation.

8. An exhaust gas purifier according to claim 1, further comprising a fuel pressure regulating means for regulating the fuel pressure in a fuel pipe, wherein the fuel pressure in said fuel pipe is reduced after the engine has stopped.

9. An exhaust gas purifier according to claim 8, wherein said fuel pressure regulating means is a bypass valve installed in parallel with a fuel pressure regulating valve.

10. An exhaust gas purifier according to claim 8, wherein said fuel pressure regulating means is a fuel pump for supplying fuel from a fuel tank to an injector and the fuel pressure in the fuel pipe is reduced by rotating the fuel pump in reverse.

11. An exhaust gas purifier according to claim 1, further comprising at least one of a means for measuring and a means for estimating the catalyst temperature, wherein said secondary air pump is operated in accordance with the measured or estimated catalyst temperature.

12. An exhaust gas purifier according to claim 11, further comprising at least one a means for measuring and a means for estimating ambient temperature, wherein said secondary air pump is operated in accordance with the measured or estimated ambient temperature and measured or estimated catalyst temperature.

13. An exhaust gas purifier according to claim 11, wherein said secondary air pump is operated for a specified length of time after the engine has stopped when the measured or estimated catalyst temperature is outside a specified range.

14. An exhaust gas purifier comprising a catalyst installed in the exhaust pipe of an engine and a secondary air pump for supplying secondary air into the exhaust pipe, wherein said secondary air pump is operated after the engine has stopped and further comprising a controller for controlling the suction valve, exhaust valve, throttle valve and ISC valve of the engine, wherein said suction valve, exhaust valve, throttle valve and ISC valve are fully opened after the engine has stopped.

15. An exhaust gas purifier according to claim 14, wherein said secondary air pump is operated for a specified length of time after the engine has stopped.

16. An exhaust gas purifier comprising a catalyst installed in the exhaust pipe of an engine and a secondary air pump for supplying secondary air into the exhaust pipe, wherein said secondary air pump is operated after the engine has stopped and further comprising a means for rotating the crank shaft of the engine, wherein said crank shaft is rotated for a specified number of times or up to a specified crank angle after the engine has stopped.

* * * * *